(12) United States Patent
Sylvain

(10) Patent No.: US 8,369,262 B2
(45) Date of Patent: Feb. 5, 2013

(54) AUTOMATED LOGON FOR DIVERSE NETWORK ACCESS

(75) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 1967 days.

(21) Appl. No.: 10/999,392

(22) Filed: Nov. 30, 2004

(65) Prior Publication Data

US 2006/0117381 A1 Jun. 1, 2006

(51) Int. Cl.
*H04W 4/00* (2009.01)

(52) U.S. Cl. ........ 370/328; 370/253; 370/254; 370/282; 370/313; 370/329; 370/395; 370/465; 455/432; 455/435.1; 455/435.2; 455/435.3; 455/443; 455/500

(58) Field of Classification Search ............ 370/465, 370/338, 328, 329, 313, 395.5, 282, 253, 370/254; 455/432.3, 443, 500, 432, 435.1–435.3
See application file for complete search history.

(56) References Cited

U.S. PATENT DOCUMENTS

| 5,903,832 A | 5/1999 | Seppanen et al. ............ 455/414 |
| 2003/0003933 A1 | 1/2003 | Deshpande et al. .......... 455/510 |
| 2003/0063581 A1* | 4/2003 | Shanbhag et al. ............ 370/328 |
| 2005/0190747 A1* | 9/2005 | Sindhwani et al. ........... 370/352 |

OTHER PUBLICATIONS

HP, "HP iPAQ Pocket PC h5400 series (ROM v1.00)—reference guide," Oct. 9, 2004, from HP.com: <http://h20000.www2.hp.com/bizsupport/TechSupport/DocumentIndex.jsp?contentType=SupportManual&lang=en&cc=us&docIndexId=179111&taskId=101&prodTypeId=215348&prodSeriesId=322914#1>, pp. 3-1 to 3-15.
Linksys, "Wireless-B Notebook Adapter," 2002, retrieved from Linksys.com: <http://www.linksys.com/servlet/Satellite?c=L_Product_C2&childpagename=US%2FLayout&cid=1115416828350&pagename=Linksys%2FCommon%2FVisitorWrapper>, pp. 17-26.
International Search Report for PCT/IB2005/002911, mailed Apr. 11, 2006.

* cited by examiner

*Primary Examiner* — Amancio Gonzalez
(74) *Attorney, Agent, or Firm* — Meyertons, Hood, Kivlin, Kowert & Goetzel, P.C.

(57) ABSTRACT

The present invention allows a mobile terminal to automatically log on to an access network, and potentially log on to an entity on the access network or associated network based on the communication zone from which communications are afforded. The mobile terminal can detect one or more available access points associated with one or more communication zones and determine the most appropriate communication zone to use when obtaining network access. Based on the selected communication zone, the mobile terminal will obtain logon information from a logon profile. The logon information will provide sufficient information to allow the mobile terminal to obtain network access via the appropriate access point. Additional logon information may be provided for logging on to a network entity once network access is afforded.

32 Claims, 4 Drawing Sheets

LOGON PROFILE

- ZONE ID (WLAN-ESSID) = Home
  - LAYER 2 = WPA
  - LAYER 3 = none
  - WPA Authentication Info. = X

- ZONE ID (WLAN-ESSID) = Office
  - LAYER 2 = WPA2
  - LAYER 3 = IPSec
  - WPA2 Authentication Info. = Y
  - IPSec server = 172.128.0.1
  - IPSec ID = user@enterprise
  - IPSec Password = xyz

- ZONE ID (WLAN-ESSID) = Coffeeshop
  - LAYER 2 = WEP
  - LAYER 3 = IPSec
  - WEP Authentication Info. = Z
  - IPSec server = vpnserver.enterprise.com
  - IPSec ID = user@enterprise
  - IPSec Password = xyz
  - Mobile IPSec enabled = yes

- ZONE ID (WLAN-ESSID) = Other
  - LAYER 2 = WEP
  - LAYER 3 = MobileIP
  - WEP Authentication Info. = Z
  - MobileIP Home Agent = 47.125.23.52
  - MobileIP ID = user@enterprise
  - MobileIP Password = z4x

- ZONE ID Cellular Zone
  - LAYER 2 = Cellular
  - LAYER 3 = IPSec
  - Cellular Authentication Info. = SIM data
  - IPSec server = vpnserver.enterprise.com
  - IPSec ID = user@enterprise
  - IPSec Password = xyz
  - Mobile IPSec enabled = yes

*FIG. 2*

AUTOMATED LOGON FOR DIVERSE NETWORK ACCESS

FIELD OF THE INVENTION

The present invention relates to wireless communications, and in particular to allowing a mobile terminal to automatically log on to different networks or network entities according to the necessary access requirements for the networks or network entities.

BACKGROUND OF THE INVENTION

The use of local wireless communications, such as those provided using the IEEE's 802.11 wireless local area network (WLAN) and Bluetooth standards, provide significant mobility for various types of mobile terminals, ranging from personal computers to personal digital assistants (PDAs) and mobile telephones. In general, local wireless access points will provide limited zones in which local wireless communications are afforded.

When a mobile terminal moves into one of the local wireless communication zones, the mobile terminal may have to log on to the access point to gain network access when registering or otherwise associating itself with the access point. Currently, this logon process requires human intervention by the user every time the mobile terminal moves from one communication zone to another or changes between local wireless and cellular communication zones. Once network access is gained, the mobile terminal generally needs to log on to one or more network entities to access or otherwise provide various services, such as email, instant messaging, voice communications, or other types of communications. These services may be the same regardless of the local wireless or cellular communication zone, or may be dependent on the local wireless or cellular communication zone, and thus, may vary from one communication zone to the next. Again, the user of the mobile terminal must manually log on to each network entity to access or receive these services.

Given the desire for mobile terminal users to be able to move from one local wireless communication zone to the next and communicate using the mobile terminal when in different local wireless communication zones, there is a need to allow the mobile terminals to automatically log on to networks as well as desired network entities without user intervention using logon information required for gaining network access from within a given communication zone. Further, if there are multiple local wireless communication zones available to the mobile terminal at any given time, there is a need to provide automated prioritization for selecting the local wireless communication zone to use.

SUMMARY OF THE INVENTION

The present invention allows a mobile terminal to automatically log on to an access network, and potentially log on to an entity on the access network or associated network based on the communication zone from which communications are afforded. The mobile terminal can detect one or more available access points, which may be local wireless or cellular based, associated with one or more communication zones and determine the most appropriate communication zone to use when obtaining network access. Based on the selected communication zone, the mobile terminal will obtain logon information from a logon profile. The logon information will provide sufficient information to allow the mobile terminal to obtain network access via the appropriate access point. Additional logon information may be provided for logging on to a network entity once network access is afforded.

The logon profile may have different logon information for different communication zones. The logon information may identify protocols to use, authentication information, addresses and port information for network entities, and any other information required to facilitate automated logon procedures. The authentication information may include user IDs, passwords, and encryption indicia. Certain entries in the logon profile may or may not be associated with logon information for network entities. Further, when multiple communication zones are available, the logon profile may provide a relative priority of communication zones, such that one communication zone will have priority over another, and the mobile terminal will be able to select the communication zone with the highest priority when multiple communication zones are available.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 2 is a table illustrating an exemplary logon profile with different communication access mechanisms.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a mobile terminal to automatically determine when communications with an access point, such as a local wireless access point or cellular base station, are available to enable access to a network and other network entities. Different access points may require different access modes, including local wireless modes or cellular access modes, and be associated with different communication zones. Upon determining that communications in one or more communication zones are available, the mobile terminal will select one of the available communication zones from which to access the associated network. Based on the selected communication zone, access mode, or both the communication zone and access mode, the mobile terminal will access a logon profile and use logon information in the logon profile to automatically log on to a network, network entity, or both though an access point associated with the communication zone. Since different local wireless and cellular access points may have different logon requirements, different logon information may be associated with different ones of the local wireless and cellular communication zones. As such, the user will not have to manually log on to different networks or desired network entities when moving from one communication zone to another.

Figure 1:
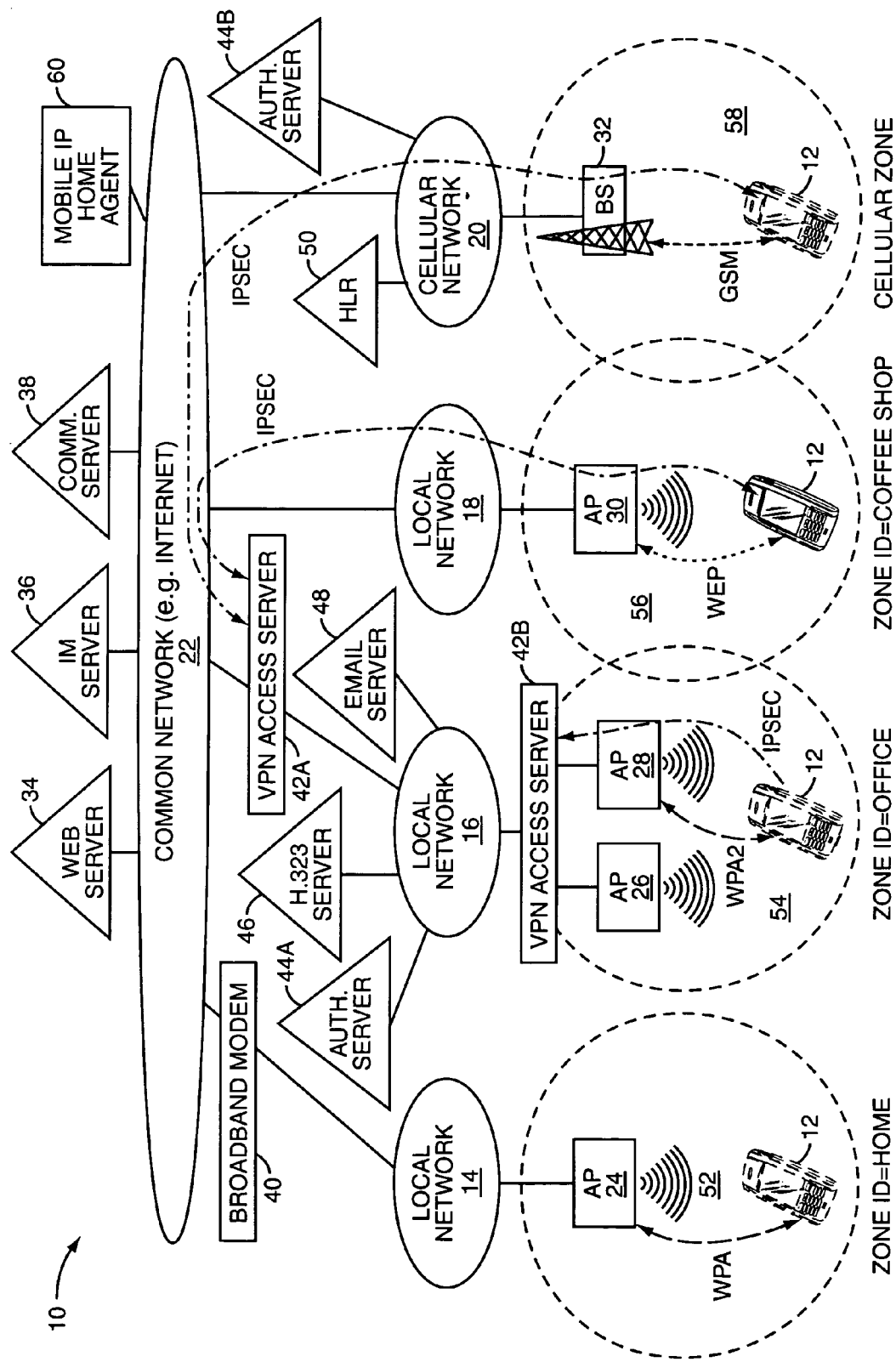
FIG. 1 is a block representation of a communication environment according to one embodiment of the present invention.

Prior to delving into the details of the present invention, an overview of a communication environment 10 is provided in FIG. 1. The communication environment 10 allows a mobile terminal 12 to establish local wireless communications with one or more local networks 14, 16, 18, or cellular communications with a cellular network 20. The local wireless communications may be facilitated using various technologies, including the IEEE's 802.11 WLAN and Bluetooth communication standards. The cellular communications may be based on Time Division Multiple Access (TMDA), Code Division Multiple Access (CDMA), Orthogonal Frequency Division Multiple Access (OFDM), or other appropriate cellular technology. The local wireless and cellular communications may support packetized voice and data communication sessions with entities on the corresponding local networks 14, 16, 18, cellular network 20, or a common network 22, which effectively connects to the local networks 14, 16, 18 as well as to the cellular network 20 in traditional fashion.

The local wireless communications are facilitated using local wireless access points, which provide a local wireless interface to the mobile terminal 12 and connect to an appropriate one of the local networks 14, 16, 18. As illustrated, an access point 24 is effectively coupled to local network 14, access points 26 and 28 are effectively coupled to local network 16, and an access point 30 is effectively connected to local network 18. In an analogous fashion, a network of base stations 32 provides a cellular interface with the mobile terminal 12 and connects to the cellular network 20, typically through a mobile switching center (not shown).

When the mobile terminal 12 is within communication range of the access points 24, 26, 28, 30 or the network of base stations 32, the mobile terminal 12 may effectively register itself with any number of devices or establish communication sessions over the respective communication networks. As illustrated, access to the common network 22, which may represent the Internet, allows access to any number of web servers 34, instant messaging (IM) servers 36, communication servers 38, or any other server providing any type of service capable of being provided to or for the mobile terminal 12. The communication server 38 may be a Session Initiation Protocol (SIP) server used to assist in the establishment of communication sessions with other communication clients on one of the local network 14, 16, 18 or over the common network 22 on behalf of the mobile terminal 12.

The local networks 14, 16, 18 may be connected to the common network 22 via any number of gateways, switches, routers, or other connecting entity. As illustrated, local network 14 is connected to the common network 22 via a broadband modem 40, which may be a cable modem, digital subscriber line (DSL) modem, or Integrated Digital Services Network (ISDN) modem. Virtual Private Network (VPN) access to the local network 16 may be facilitated through a VPN access server 42A via the common network 22 or through VPN access server 42B via access points 26, 28 and local network 16.

In addition to providing various services and supporting communications over the common network 22, each of the local networks 14, 16, 18 may provide local servers providing local services. Local network 16 may be associated with an authentication server 44A for providing local authentication and authorization for the mobile terminal 12 or associated communications, an H.323 server 46 for facilitating communications when the mobile terminal 12 is supported by either of the access points 26 or 28, and an email server 48 for providing an email service that is associated with the local network 16. The authentication server 44A may be used to authenticate the mobile terminal 12 and authorize the mobile terminal 12 to use the services provided by any of the servers on the local network 16 or common network 22, as well as establish communications over the local network 16 or common network 22. Notably, the authentication server 44A could be located on the common network 22 to facilitate more global operation.

As illustrated, local networks 14 and 18 are not associated with local servers to provide local services, and merely provide access to the common network 22, wherein services provided by servers on the common data network 22 are made accessible to the mobile terminal 12. The cellular network 20 may include various services, such as an authentication service provided by an authentication server 44B or a messaging service provided by a messaging server (not shown). The messaging service may, for example, provide a Short Message Service (SMS) for cellular applications whereas the authentication server 44B may be an authentication, authorization, and accounting (AAA) server.

In general, access points, such as access points 24, 26, 28, and 30, may be used alone or in association with other access points to form areas in which local wireless communications are possible. These areas are generally referred to as local wireless communication zones, which may or may not overlap one another. In FIG. 1, access point 24 provides a home zone 52, which is associated with the user's residence. Access points 26 and 28 cooperate to provide an office zone 54 associated with the user's office location. Access point 30 provides a zone in a coffee shop (coffee shop zone 56), which overlaps a portion of the office zone 54. Thus, there will be certain locations between the office and coffee shop wherein local wireless communications are possible via the access point 30 as well as one of the access points 26 or 28. Notably, the cellular coverage provided by the network of base stations 32 may overlap any or all of the local wireless communication zones, but as illustrated, only overlaps a portion of the coffee shop zone 56. For clarity, the range of cellular communications is referred to as the cellular zone 58. From the illustrated example, the mobile terminal 12 may access a variety of services or establish communications with a remote communication client (not shown) via a variety of the local networks 14, 16, 18 or via the cellular network 20, depending on the location of the mobile terminal 12. Further, the mobile terminal 12 may be able to establish communications from more than one of the communication zones (home 52, office 54, and coffee shop 56) as well as the cellular zone 58, depending on its location. A MobileIP home agent 60 (IETF RFC 3344) may be provided to reduce the need to log on to the same common network entities when the mobile terminal 12 moves from one communication zone to another.

Traditionally, every time the mobile terminal 12 moves from one communication zone to another, the user would be required to manually select an appropriate access point through which communications should be established, as well as manually initiate logon procedures to log on to the network associated with the access point as well as network entities on or accessible through the network. If such flexibility were not available, the mobile terminal 12 would only be able to communicate using local wireless communications when within a certain communication zone. As such, there is generally a need to log on to networks when moving from one communication zone to another or when moving between communication zones and cellular zones. Logging on to a network where access is provided through an appropriate local wireless communication zone generally requires a logon procedure with a corresponding access point, such as access points 24, 26, 28, and 30. The present invention automates this registration with the access points 24, 26, 28, 30 as well as any desired network entities, depending on user-defined criteria, the available local wireless communication zones, and perhaps the communication access mode used to facilitate access. Further, the present invention may provide such functionality for cellular communication zones 58 along with those provided for the local wireless communication zones 52, 54, 56, as will be described below.

The mobile terminal 12 will include logon criteria required to log on to different networks from different local wireless or cellular communication zones. In particular, the mobile terminal 12 will select an available local wireless access point or base station associated with a desired local wireless communication zone or cellular communication zone. Based on the selected local wireless communication zone or cellular communication zone, a logon profile is accessed to obtain logon information required to log on to a local network 14, 16, 18 or cellular network 20 associated with the local wireless communication zone 52, 54, 56 or the cellular communication zone 58. Once the logon information is obtained, the mobile terminal 12 will log on to the associated local network 14, 16, 18 or cellular network 20 via the corresponding access points 24, 26, 28, 30 or base station 32. Similarly, the logon information may identify various network entities and any associated information required for logging on to the network entities.

As illustrated in FIG. 1, lower level network access is facilitated when the mobile terminal 12 logs on to and establishes communications with an access point, such as the access point 30 for local wireless communications or the base station 32 for cellular communications. This lower level connection is represented by dashed lines between the respective access point and the mobile terminal 12. A higher level connection providing access to a network entity is represented by a dashed and dotted line, and will extend through the corresponding access point to the VPN access server 42A through either the local network 18 or cellular network 20, and the common network 22. When the mobile terminal 12 is in the communication zone 54, a higher level connection to the VPN access server 42B may be facilitated through the access point 28, wherein a lower level connection with the access point 28 is used to support local wireless communications between the access point 28 and the mobile terminal 12. The lower level and higher level connections illustrated in FIG. 1 correspond to the logon profile provided in FIG. 2.

With reference to FIG. 2, an exemplary logon profile for a mobile terminal 12 is provided. The logon profile may identify logon criteria associated with the various local wireless communication zones 52, 54, 56 and cellular zone 58. Different ones of the local wireless communication zones 52, 54, 56 and cellular zone 58 may identify logon criteria for the respective local networks 14, 16, 18 and cellular network 20 and optionally logon information for logging on to a network entity. In the illustrated logon profile, network access logon information is generally associated with a Layer 2 access protocol, wherein logon information associated with a network entity is associated with a Layer 3 protocol. Those skilled in the art will recognize that different applications may require logon information at different protocol layers. Those shown in FIG. 2 are for illustrative purposes only. Logon information may include various types of information, including information identifying communication as well as security protocols to use for network or network entity access, authentication information, which may include the mobile terminal's identification, passwords, encryption keys or like information, or any other information required for authentication or authorization associated with network or network entity access. Each communication zone, whether local wireless or cellular, may include authentication information for network access as well as access to a network entity. The logon information may identify a network entity's address, identification of a user of the mobile terminal 12, additional passwords, or indications of whether various types of security are enabled.

The logon profile of FIG. 2 has logon information for the four zones identified in FIG. 1, as well as logon information for a zone or zones that are not identified or illustrated in FIG. 1. For example, the communication zone with the zone ID "Other" may be used as a default when the other identified communication zones are not available. The local wireless communication zone 52 having the zone ID of "Home" which may correspond to a local wireless area network Extended Service Set Identifier (ESSID—IEEE 802.11), may specify the use of the first generation wireless protected access (WPA) protocol for network access to the local network 14. The WPA protocol is a Layer 2 protocol. For the Home local wireless communication zone 52, there is no logon information or network entity, and any WPA authentication information required for obtaining access to the local network 14 via the access point 24 will be provided.

The local wireless communication zone having the zone ID of "Office" defines both network access and network entity access logon information. The network access is defined to use the second generation WPA protocol (WPA2) at Layer 2, and use IP security (IPSec) at Layer 3 to log on to an IPSec server having an address of 172.128.0.1. The authentication information for network access is defined as "Y" wherein for access to the IPSec server an IPSec password of "xyz" is provided along with an IPSec ID for the user of the mobile terminal 12 (user@enterprise).

The local wireless communication zone associated with the zone ID of "Coffeeshop" also defines network access as well as network entity access. In this instance, network access at Layer 2 is controlled by the wireline equivalent privacy (WEP) protocol, and is associated with authentication information "Z." Layer 3 access to the network entity is controlled by IPSec, wherein mobile IPSec protocol is enabled. The IPSec ID and password will remain the same, yet the IPSec server address through which a VPN may be established is different, and is illustrated as vpnserver.enterprise.com.

The unspecified local wireless zone associated with an ID of "Other" uses the WEP protocol at Layer 2 for network access, and the MobileIP protocol at Layer 3 for network entity access. The WEP authentication information is also "Z" wherein the use of the MobileIP protocol required the provision of a MobileIP home agent address (47.125.23.52), a MobileIP ID (user@enterprise), and perhaps a MobileIP password (z4x).

For cellular access, a cellular zone is identified and associated with logon information required for logging on to the cellular network, as well as a network entity. The Layer 2 protocol for cellular access will be the appropriate Layer 2 cellular protocol, whereas access to the network entity in this example uses IPSec at Layer 3. The logon information includes the necessary cellular authentication information, which may be the cellular system Subscriber Identity Module (SIM) data, and the IPSec information required for establishing a VPN with the IPSec server having the address vpnserver.enterprise.com. Again, Mobile IPSec is enabled, and the IPSec ID and password remain the same as described above. Additionally, the logon information may identify whether an access portal is used, and provide any additional access portal logon information, which will assist in establishing access to other networks or other network entities through the cellular network 20.

From the above, one of ordinary skill in the art will recognize numerous types of logon information for both network access and access to network entities. When multiple local wireless communication zones as well as cellular zones are available, the communication zone to use may be based on a predefined priority, which may simply be the order in which the local wireless or cellular communication zones are listed in the logon profile. In other embodiments, other priority criteria may be provided alone or in combination with the logon information.

Figure 3:
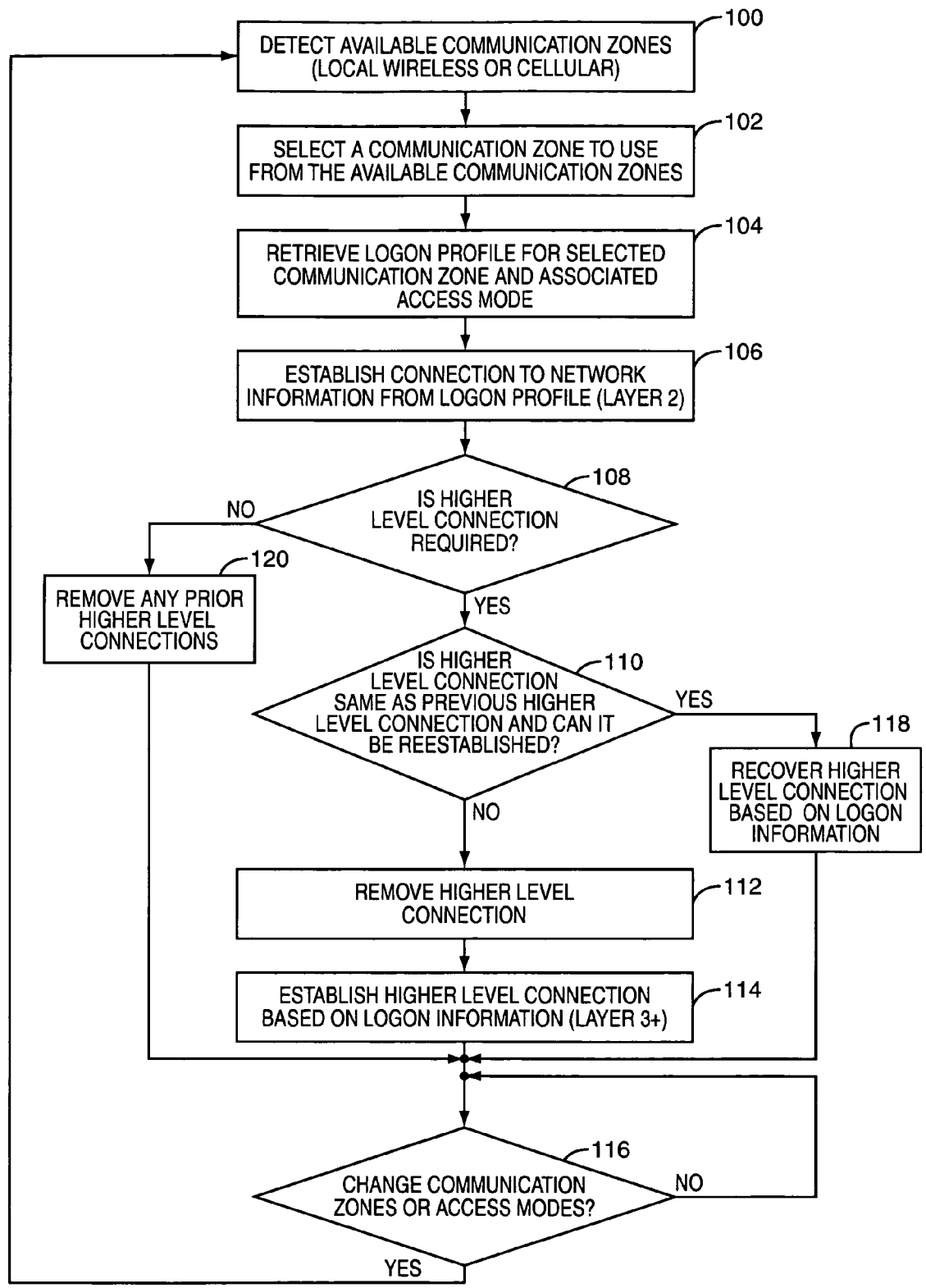
FIG. 3 is an exemplary flow diagram illustrating operation of a mobile terminal according to one embodiment of the present invention.

Turning now to FIG. 3, an operational flow according to an exemplary embodiment of a mobile terminal 12 is described. Initially, the mobile terminal 12 will detect available communication zones, either local wireless, cellular, or a combination thereof, from which communications are possible (step 100). The mobile terminal 12 will then select a communication zone to use from the available communication zones, if multiple communication zones are available for communications (step 102). Next, the logon profile for the selected communication zone, and perhaps an associated access mode, is retrieved to obtain the necessary logon information for a logon procedure to obtain network access for the communication zone (step 104). Next, the mobile terminal 12 will establish a connection to the network based on the logon information from the logon profile (step 106). In particular, the logon information will include the necessary information to allow the mobile terminal 12 to interact with the appropriate local wireless access point or cellular network 20 to establish communications with the local wireless access point or cellular network 20 to afford network access.

The mobile terminal 12 will then determine whether a higher level connection is required, such as a connection to a network entity (step 108). The logon information in the logon profile may provide the requisite information to determine whether such higher level connection is required, and if such higher connection is required provide the logon information for the higher level connection to the network entity. If a higher level connection is required, the mobile terminal 12 may determine whether the higher level connection is the same as a previous higher level connection that was established when the mobile terminal 12 was within another local wireless communication zone or supporting cellular communications, and determine whether the previous higher level connection can be reestablished (step 110). If the higher level connection is not the same or cannot be reestablished, the mobile terminal 12 may attempt to remove the higher level connection that was previously established (step 112), and take the necessary steps to establish a new higher level connection based on the logon information (step 114). As such, a second logon procedure for obtaining access to a network entity is automatically afforded after the lower level connection for network access is completed. At this point, the mobile terminal 12 will monitor for changes in communication zones or access modes (step 116), wherein when a change is required the process will repeat.

If the higher level connection that was previously established can be reestablished from within the new communication zone (step 110), the mobile terminal 12 will attempt to recover the higher level connection based on the logon information in the logon profile (step 118), and proceed to monitor for changes in the communication zone or access mode (step 116). If a higher level connection is not required (step 108), the mobile terminal 12 may remove any prior higher level connections (step 120) and then proceed to monitor for changes in communication zone or access mode as previously described (step 116).

Figure 4:
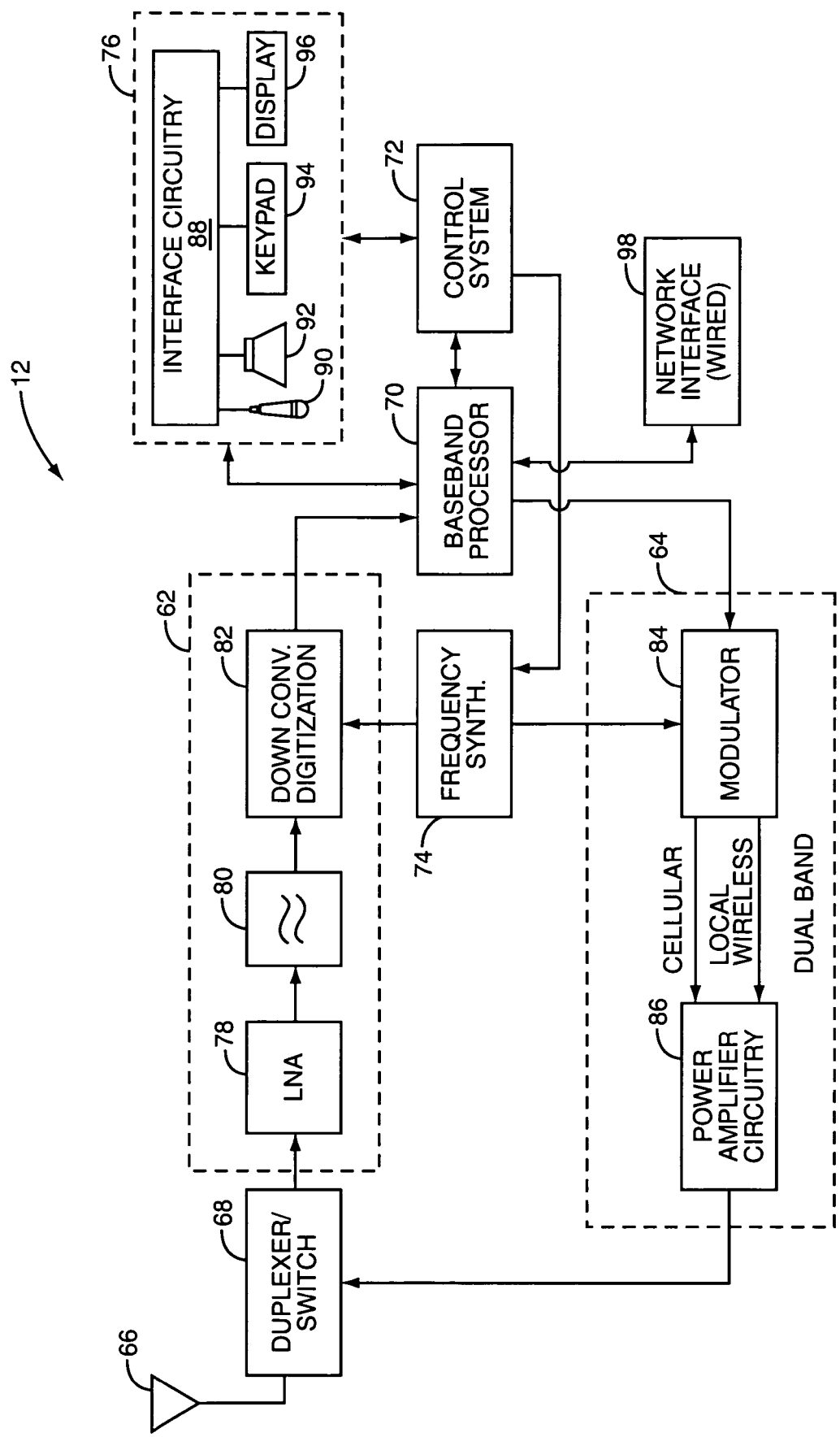
FIG. 4 is a block representation of a mobile terminal according to one embodiment of the present invention.

The basic architecture of the mobile terminal 12 is represented in FIG. 4 and may include a receiver front end 62, a radio frequency transmitter section 64, an antenna 66, a duplexer or switch 68, a baseband processor 70, a control system 72, a frequency synthesizer 74, and a user interface 76. The receiver front end 62 receives information bearing radio frequency signals from one or more remote transmitters provided by a base station. A low noise amplifier 78 amplifies the signal. A filter circuit 80 minimizes broadband interference in the received signal, while downconversion and digitization circuitry 82 downconverts the filtered, received signal to an intermediate or baseband frequency signal, which is then digitized into one or more digital streams. The receiver front end 62 typically uses one or more mixing frequencies generated by the frequency synthesizer 74. The baseband processor 70 processes the digitized received signal to extract the information or data bits conveyed in the received signal. This processing typically comprises demodulation, decoding, and error correction operations. As such, the baseband processor 70 is generally implemented in one or more digital signal processors (DSPs).

On the transmit side, the baseband processor 70 receives digitized data, which may represent voice, data, or control information, from the control system 72, which it encodes for transmission. The encoded data is output to the transmitter 64, where it is used by a modulator 84 to modulate a carrier signal that is at a desired transmit frequency. Power amplifier circuitry 86 amplifies the modulated carrier signal to a level appropriate for transmission, and delivers the amplified and modulated carrier signal to the antenna 66 through the duplexer or switch 68. The control system 72 will operate to provide the functions described above that embody the concepts of the invention. The control system 72 may be integrated into or distributed among different processing circuitry.

As noted above, the mobile terminal 12 may be able to communicate wirelessly with the access points 24, 26, 28, and 30 as well as with the cellular network 20 via the network of base stations 32. Accordingly, the receiver front end 62, baseband processor 70, and radio frequency transmitter section 64 cooperate to provide either a wireless interface for the cellular network 20 or the local wireless interface for the access points 24, 26, 28, and 30. These functions may be implemented using redundant circuitry, or by configuring common circuitry to operate in different modes. The configuration of the mobile terminal 12 will be dictated by economics and designer choice. Further, the functionality of the mobile terminal 12 as described above, will be controlled by the control system 72 in association with these systems.

A user may interact with the mobile terminal 12 via the interface 76, which may include interface circuitry 88 associated with a microphone 90, a speaker 92, a keypad 94, and a display 96. The interface circuitry 88 typically includes analog-to-digital converters, digital-to-analog converters, amplifiers, and the like. Additionally, it may include a voice encoder/decoder, in which case it may communicate directly with the baseband processor 70. The microphone 90 will typically convert audio input, such as the user's voice, into an electrical signal, which is then digitized and passed directly or indirectly to the baseband processor 70. Audio information encoded in the received signal is recovered by the baseband processor 70, and converted by the interface circuitry 88 into an analog signal suitable for driving the speaker 92. The keypad 94 and display 96 enable the user to interact with the mobile terminal 12, input numbers to be dialed, access and select addresses or dialing plans, select from a number of available networks to use for communications, as well as provide traditional control of the mobile terminal 12.

In addition to or in lieu of the local wireless and cellular interfaces, the mobile terminal 12 may have other communication interfaces, such as a wired network interface 98, to facilitate communications using various communication technologies. Those skilled in the art will recognize the numerous types of communication interfaces available for the present invention. For additional information, please see U.S. application Ser. No. 10/409,280 filed Apr. 8, 2003 entitled INTEGRATED WIRELINE AND WIRELESS SERVICE, and U.S. application Ser. No. 10/967,701 filed Oct. 15, 2004 entitled AUTOMATED REGISTRATION BASED ON LOCAL WIRELESS ZONE IDENTIFICATION, the disclosures of which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   detecting a plurality of available communication zones;
   identifying an available access point providing a first communication zone of the plurality of available communication zones from which access to at least one communication network is provided;
   retrieving a logon profile for the first communication zone, the logon profile providing logon information to facilitate network access from the plurality of available communication zones;
   obtaining from the logon profile first logon information based on the communication zone, the first logon information being sufficient to gain access to the at least one communication network;
   establishing a connection with the available access point using the first logon information to gain access to the at least one communication network;
   determining whether a higher level connection to at least one network entity in the at least one communication network is required based on the first logon information;
   if a higher level connection to the at least one network entity is required, determining whether a previous higher level connection to the at least one network entity exists and whether the previous higher level connection to the at least one network entity can be reestablished;
   reestablishing the previous higher level connection to the at least one network entity based on the logon information if the previous higher level connection to the at least one network entity exists and can be reestablished; and
   establishing a new higher level connection if there is no previous higher level connection to the at least one network entity or if the previous higher level connection to the at least one network entity cannot be reestablished.

2. The method of claim 1 further comprising:
   obtaining from the logon profile second logon information based on the communication zone, the second logon information being sufficient to gain access to at least one network entity on the at least one communication network; and
   establishing the new higher level connection with the at least one network entity using the second logon information to gain access to the at least one network entity.

3. The method of claim 2 wherein the logon profile defines a plurality of communication zones, each of which is associated with network access logon information, including the first logon information, sufficient to facilitate network access from a corresponding one of the plurality of communication zones and certain of which further providing network entity access logon information, including the second logon information, sufficient to facilitate network entity access.

4. The method of claim 2 wherein the logon profile further defines a relative priority for the plurality of communication zones.

5. The method of claim 4 wherein identifying the available access point comprises: identifying a plurality of access points providing communication zones from which access to a plurality of communication networks is possible; and
   selecting the available access point from the plurality of access points based on the relative priority for the communication zones.

6. The method of claim 5 wherein the plurality of access points comprise at least one local wireless access point providing a local wireless communication zone.

7. The method of claim 6 wherein the plurality of access points comprise at least one base station of a cellular network providing a cellular communication zone.

8. The method of claim 1 further comprising effecting disconnection of the previous higher level connection with the at least one network entity.

9. The method of claim 1 wherein the previous higher level connection with the at least one network entity is established from another communication zone.

10. The method of claim 1 wherein the logon information identifies a specific network access protocol to use for network access.

11. The method of claim 1 wherein the first logon information identifies authentication information necessary for network access.

12. The method of claim 11 wherein the authentication information comprises at least one of the group consisting of user identification, a password, and encryption indicia.

13. The method of claim 1 wherein the logon profile identifies a specific network entity access protocol to use to access the at least one network entity.

14. The method of claim 1 wherein the logon profile identifies authentication information to use to access the at least one network entity.

15. The method of claim 14 wherein the authentication information comprises at least one of the group consisting of user identification, a password, port information, and encryption indicia.

16. The method of claim 14 wherein the logon information is sufficient to establish a virtual private network involving the at least one network entity.

17. A mobile terminal comprising:
    at least one wireless communication interface;
    a control system associated with the at least one wireless communication interface and adapted to:
    detect a plurality of available communication zones;

identify an available access point providing a first communication zone of the plurality of available communication zones from which access to at least one communication network is provided;

retrieve a logon profile for the first communication zone, the logon profile providing logon information to facilitate network access from the plurality of available communication zones;

obtain from the logon profile first logon information based on the communication zone, the first logon information being sufficient to gain access to the at least one communication network; and establish a connection with the available access point using the first logon information to gain access to the at least one communication network;

determine whether a higher level connection to at least one network entity in the at least one communication network is required based on the first logon information;

if a higher level connection to the at least one network entity is required, determine whether a previous higher level connection to the at least one network entity exists and whether the previous higher level connection to the at least one network entity can be reestablished;

reestablish the previous higher level connection to the at least one network entity based on the logon information if the previous higher level connection to the at least one network entity exists and can be reestablished; and establish a new higher level connection if there is no previous higher level connection to the at least one network entity or if the previous higher level connection to the at least one network entity cannot be reestablished.

18. The mobile terminal of claim 17 wherein the control system is further adapted to:

obtain from the logon profile second logon information based on the communication zone, the second logon information being sufficient to gain access to at least one network entity on the at least one communication network; and establish the new higher level connection with the at least one network entity using the second logon information to gain access to the at least one network entity.

19. The mobile terminal of claim 18 wherein the logon profile defines a plurality of communication zones, each of which is associated with network access logon information, including the first logon information, sufficient to facilitate network access from a corresponding one of the plurality of communication zones and certain of which further providing network entity access logon information, including the second logon information, sufficient to facilitate network entity access.

20. The mobile terminal of claim 18 wherein the logon profile further defines a relative priority for the plurality of communication zones.

21. The mobile terminal of claim 20 wherein to identify the available access point, the control system is further adapted to:

identify a plurality of access points providing communication zones from which access to a plurality of communication networks is possible; and select the available access point from the plurality of access points based on the relative priority for the communication zones.

22. The mobile terminal of claim 21 wherein the plurality of access points comprise at least one local wireless access point providing a local wireless communication zone.

23. The mobile terminal of claim 22 wherein the plurality of access points comprise at least one base station of a cellular network providing a cellular communication zone.

24. The mobile terminal of claim 17 wherein the control system is further adapted to effect disconnection of the previous higher level connection with the at least one network entity.

25. The mobile terminal of claim 17 wherein the the previous higher level connection with the at least one network entity is established from another communication zone.

26. The mobile terminal of claim 17 wherein the logon information identifies a specific network access protocol to use for network access.

27. The mobile terminal of claim 17 wherein the first logon information identifies authentication information necessary for network access.

28. The mobile terminal of claim 27 wherein the authentication information comprises at least one of the group consisting of user identification, a password, and encryption indicia.

29. The mobile terminal of claim 17 wherein the logon profile identifies a specific network entity access protocol to use to access at least one network entity.

30. The mobile terminal of claim 29 wherein the logon profile identifies authentication information to use to access at least one network entity.

31. The mobile terminal of claim 30 wherein the authentication information comprises at least one of the group consisting of user identification, a password, portal information, and encryption indicia.

32. The mobile terminal of claim 30 wherein the logon information is sufficient to establish a virtual private network involving the at least one network entity.

\* \* \* \* \*